United States Patent
Richard

(10) Patent No.: US 11,719,012 B2
(45) Date of Patent: Aug. 8, 2023

(54) SEISMIC ANCHOR FOR CURTAIN WALLS

(71) Applicant: Michael William Richard, Richmond (CA)

(72) Inventor: Michael William Richard, Richmond (CA)

(\*) Notice: Subject to any disclaimer, the term of this patent is extended or adjusted under 35 U.S.C. 154(b) by 103 days.

(21) Appl. No.: 17/421,894

(22) PCT Filed: Jan. 21, 2020

(86) PCT No.: PCT/CA2020/050069
§ 371 (c)(1),
(2) Date: Jul. 9, 2021

(87) PCT Pub. No.: WO2020/150818
PCT Pub. Date: Jul. 30, 2020

(65) Prior Publication Data
US 2022/0098888 A1   Mar. 31, 2022

(30) Foreign Application Priority Data
Jan. 21, 2019 (CA) .............................. CA 3030735

(51) Int. Cl.
*E04H 9/02* (2006.01)
*E04B 2/90* (2006.01)

(52) U.S. Cl.
CPC .............. *E04H 9/021* (2013.01); *E04B 2/90* (2013.01)

(58) Field of Classification Search
None
See application file for complete search history.

(56) References Cited

U.S. PATENT DOCUMENTS

| | | | | |
|---|---|---|---|---|
| 3,913,287 A | * | 10/1975 | Chapman, Jr. ............ | E04B 5/06 52/235 |
| 4,546,582 A | | 10/1985 | Gartner | |
| 4,662,135 A | | 5/1987 | Tanikawa et al. | |
| 4,782,635 A | * | 11/1988 | Hegle ....................... | E04B 2/94 52/235 |
| 5,063,718 A | * | 11/1991 | Nonis ....................... | E04B 2/90 52/235 |
| 5,077,947 A | * | 1/1992 | Takeda ..................... | E04B 2/94 52/235 |
| 5,158,392 A | * | 10/1992 | Takeda ..................... | E04B 2/34 52/235 |
| 5,253,459 A | * | 10/1993 | Parinas .................... | E04B 2/96 52/235 |

(Continued)

FOREIGN PATENT DOCUMENTS

KR   20120104830 A   \*   9/2012

OTHER PUBLICATIONS

International Search Report and Written Opinion of the International Searching Authority issued in PCT/CA2020/050069, dated Apr. 15, 2020.

*Primary Examiner* — Joshua K Ihezie
(74) *Attorney, Agent, or Firm* — Arc IP Law, PC; Joseph J. Mayo

(57) ABSTRACT

A curtain wall panel mounting system comprises a ball anchor seated in a spherical cavity or a cylindrical cavity with plugs nearly abutting the ball of the anchor. A stem extends from the ball to connect to the wall panel. Under seismic stress, the ball may swivel within the cavity so as to pivot the anchor, allowing the attached wall panel to angle itself to accommodate the stress.

10 Claims, 19 Drawing Sheets

(56) References Cited

U.S. PATENT DOCUMENTS

| | | | |
|---|---|---|---|
| 5,832,678 A | 11/1998 | Newcomb et al. | |
| 6,658,804 B2 | 12/2003 | Leytes et al. | |
| 6,675,539 B2 * | 1/2004 | Shreiner | E04B 7/00 |
| | | | 52/573.1 |
| 2003/0033764 A1 * | 2/2003 | Ting | E04B 2/96 |
| | | | 52/235 |
| 2003/0205004 A1 * | 11/2003 | Shreiner | E04B 7/00 |
| | | | 52/167.3 |
| 2004/0200156 A1 | 10/2004 | Velasquez | |
| 2008/0222981 A1 * | 9/2008 | De Gobbi | E04B 1/41 |
| | | | 52/235 |
| 2010/0186315 A1 * | 7/2010 | Tambakakis | E06B 3/5427 |
| | | | 52/235 |
| 2013/0051903 A1 * | 2/2013 | Ra | E04B 2/90 |
| | | | 403/205 |
| 2019/0093349 A1 * | 3/2019 | LeVan | E04B 2/885 |
| 2022/0025651 A1 * | 1/2022 | White | E04B 1/4107 |

* cited by examiner

SEISMIC ANCHOR FOR CURTAIN WALLS

FIELD OF THE INVENTION

This invention relates to systems for mounting curtain wall panels or windows to a building structure.

BACKGROUND OF THE INVENTION

Seismic isolation and accommodating seismic conditions in buildings, including in the mounting of curtain walls, are known and various means of doing so have been proposed. They include ball and socket systems, roller bearings, hinged pin and collar joints, a double hook system for swiveling a window or panel in relation to an adjacent one and abutting curved surfaces that roll across one another.

US Patent Publication No. 2010/0186315 to Tambakakis discloses a sliding line that is provided on the top of the windows through mutual hooks to effectively hinge the windows and allow the displacement of one story to be independent from the others. The hinge provides the ability of the window panel to swivel about an adjacent panel to relieve seismic stress on the structure.

U.S. Pat. No. 6,658,804 to Leytes discloses a curtain wall having panels that are linked horizontally and vertically for horizontal and vertical rotation to accommodate earthquake loads among other loads. Horizontally adjacent panels are joined to a cable type structural member via an anchor fixture, which allows the structural member to move freely along the wall. Notably, curved surfaces of abutting wall panels roll against one another.

U.S. Pat. No. 4,546,582 to Gartner discloses horizontally adjacent curtain wall units that are supported by a fastener on a building skeleton frame for earthquake protection. Rollers with shafts travel in slots in a panel-to-panel connector to allow the panel to move laterally toward an adjacent panel. In one embodiment, a ball is seated in a channel between top and bottom panels to allow the panels to slide laterally in relation to one another. Gartner appears to contemplate only sliding motion and not rotation about the ball.

U.S. Pat. No. 5,832,678 to Newcomb discloses portal apparatus for interconnection between adjacent first and second structures in order to maintain operative communication between the structures under seismic conditions. Newcomb uses a pin and channel arrangement between two room structures.

US Patent Publication No. 2003/0205004 to Shreiner relies on a cylindrical pin and channel arrangement between a parapet and a roof to allow both rotation and sliding of the roof under seismic conditions.

U.S. Patent Publication No. 2004/0200156 to Velasquez discloses a shafted ball and socket arrangement between structural members, with cushioning about the shaft to dampen its movement during earthquakes.

It is an object of the present invention to provide a curtain wall system that anchors the curtain wall panels or windows in an effective manner to accommodate seismic events.

These and other objects will be better understood by reference to this application as a whole. Not all of the objects are necessarily met by all embodiments of the invention described below or by the invention defined by each of the claims.

SUMMARY OF THE INVENTION

The invention relies on the use of a ball anchor that is seated within a frusto-cylindrical channel formed in the edge of the floor of a multi-story building. A shaft, preferably threaded, extends upward from the ball and through an enlarged aperture in a bracket that caps the channel. The enlargement of the aperture allows for lateral play of the shaft under seismic conditions. The shaft is otherwise embedded into or secured to a curtain wall panel or window to be mounted to the building structure. Dampening plugs may be provided on each side of the ball.

In one aspect, the invention comprises a curtain wall panel mounting system to accommodate seismic stresses. The system comprises a slab-mounting structure mounted on the outer edge of a floor of a multi-story building slab and a panel-securing structure for securing a wall panel thereto. An anchor has a stem that is secured to the panel-securing structure. The stem terminates in an end that has a substantially circular vertical cross-section and that is received in a cavity in the slab-mounting structure. The cavity has a frusto-circular cross-section corresponding to the shape of the end of the anchor such that the end may swivel within the cavity so as to pivot said anchor and the attached wall panel.

While the end of the anchor is circular in a vertical section thereof, the overall shape of the end may be frusto-cylindrical, namely in the shape of a truncated cylinder, with the truncation representing the stem extending from the end. The cavity in such case should be frusto-cylindrical to accommodate the substantially cylindrical anchor end.

A circular vertical cross-section for the anchor end may also be realized with a frusto-spherical end in the shape of a ball with a stem. In such case, the cavity may be either cylindrical (actually frusto-cylindrical to allow for the protrusion of the anchor stem) or spherical (actually frusto-spherical).

In another aspect, the invention is a ball anchor mount system for panels of a curtain wall in a multi-story building. A frusto-cylindrical channel is provided along the edge of a floor of the building. A ball anchor is received in the channel, a ball portion of the anchor being sized to fit snugly within the channel and to be swivelable within the channel. An anchor stem extends from the ball of the anchor and extends out of an aperture in the channel. The aperture accommodates some lateral displacement of the stem as the ball swivels within the channel. The stem is in turn secured to a curtain wall panel. The ball anchor may swivel within the channel to accommodate a re-orientation of the wall panel under the effect of a seismic event.

In another aspect, the invention is a ball anchor system used to connect two adjacent wall panels to allow relative pivoting movement between them and in relation to a bracket holding each panel. A channel is provided within the adjacent wall panels to receive an elongated member extending between the panels and into the channels.

Other more detailed aspects of the invention will be appreciated by reference to the detailed description and the drawings.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which.

DETAILED DESCRIPTION OF AT LEAST ONE MODE FOR CARRYING OUT THE INVENTION IN TERMS OF EXAMPLE(S)

Figure 1:
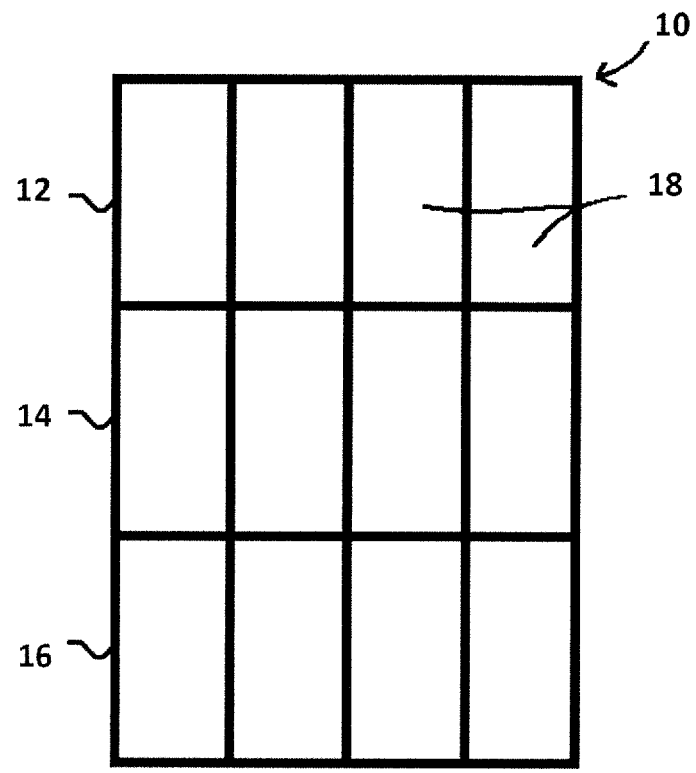
FIG. 1 is a front view of a portion of a curtain wall spanning several floors of a building.

FIG. 1 is a front view of a section of a curtain wall 10 spanning several floors 12, 14, 16 of a building. Individual curtain wall panels 18 are installed against the side of the building by connecting the panels to the successive floor slabs.

Figure 2:
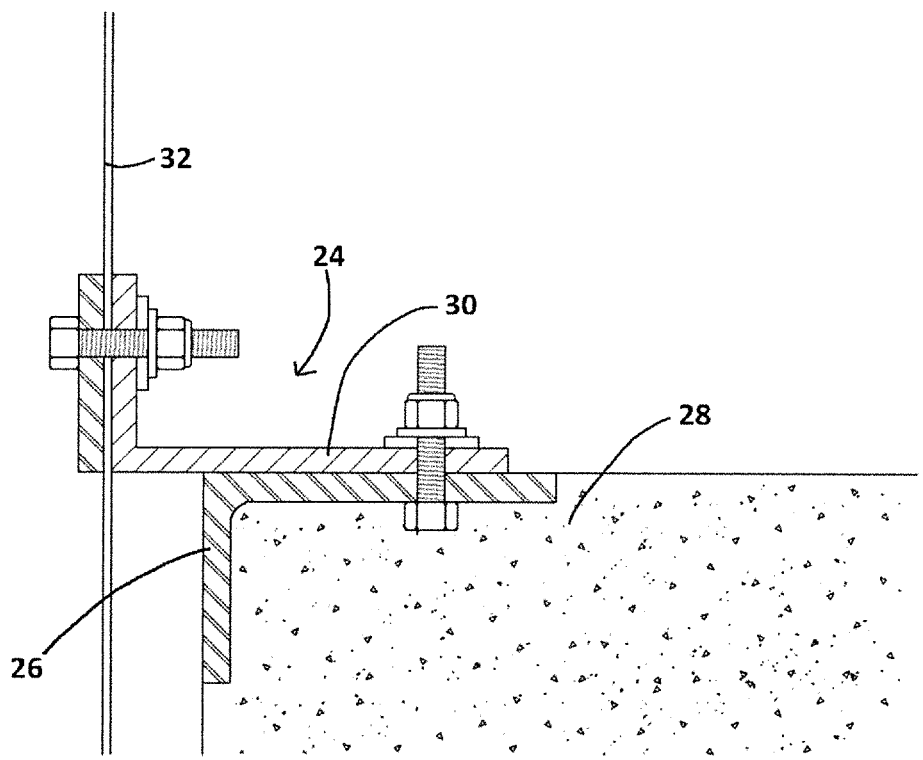
FIG. 2 is side sectional view of a prior art mount system for a curtain wall without seismic accommodation.

FIG. 2 is a side sectional view of a typical prior art curtain wall mount system 24 that does not have any seismic adaptation. A bent plate slab corner 26 is embedded at the edge of the concrete floor slab 28. An angle 30 is rigidly attached to the corner 26 to provide a contact face for a curtain wall panel 32 which is rigidly attached to the angle 30. Additional elements such as insulation, a vapor retarder and interior finishing are not shown. It will be appreciated that the rigid connection of the panel 32 to the slab 28 is stressed during seismic events and presents a risk of breakage of the panels. The present invention seeks to reduce such stress.

Figure 3:
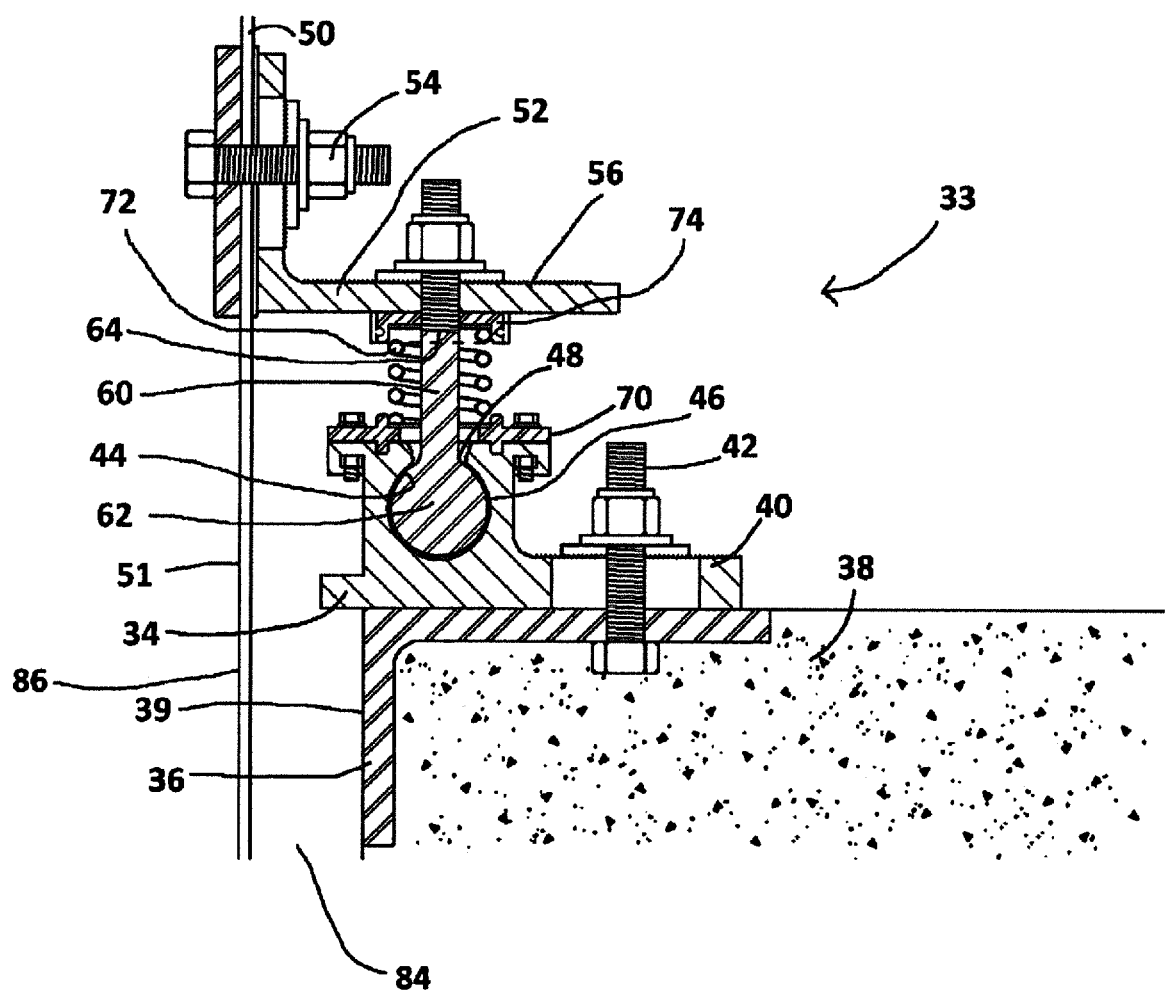
FIG. 3 is a side section view of the preferred embodiment of the invention, the threads being also shown for clarity.
Figure 4:
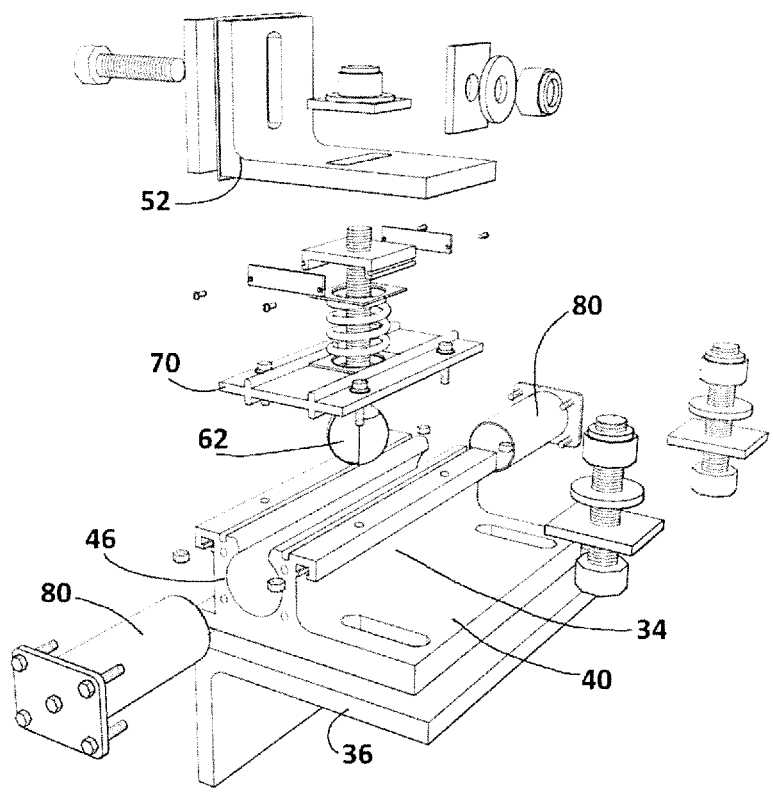
FIG. 4 is an exploded perspective view of the preferred embodiment.
Figure 5A:
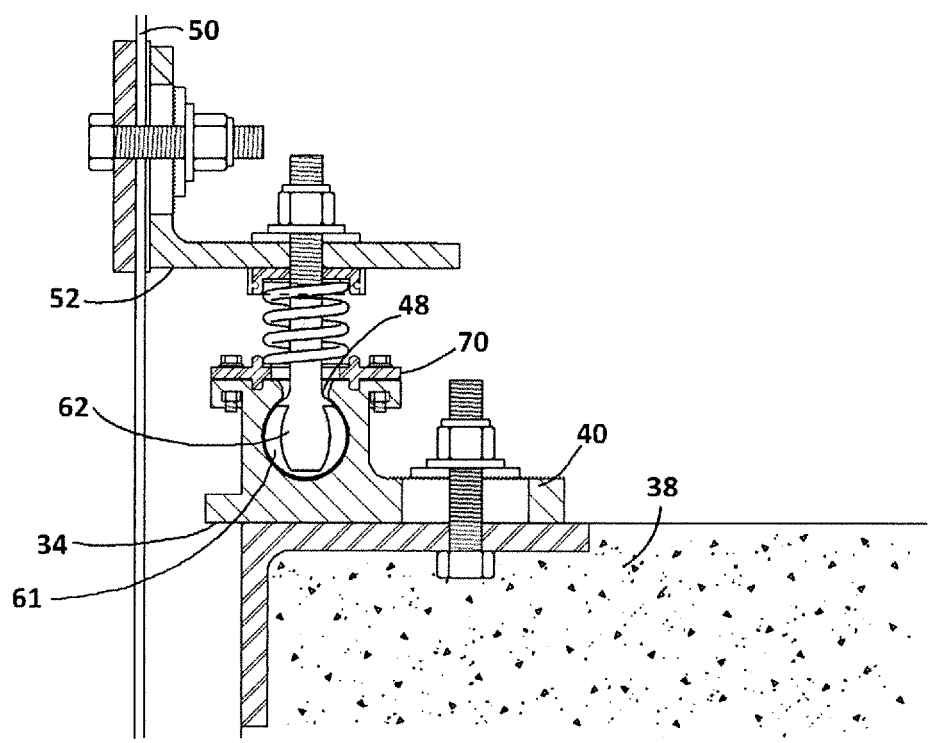
FIG. 5a is a side vertical sectional view of the preferred embodiment taken at a position that allows a side view of the spring and ball.
Figure 5B:
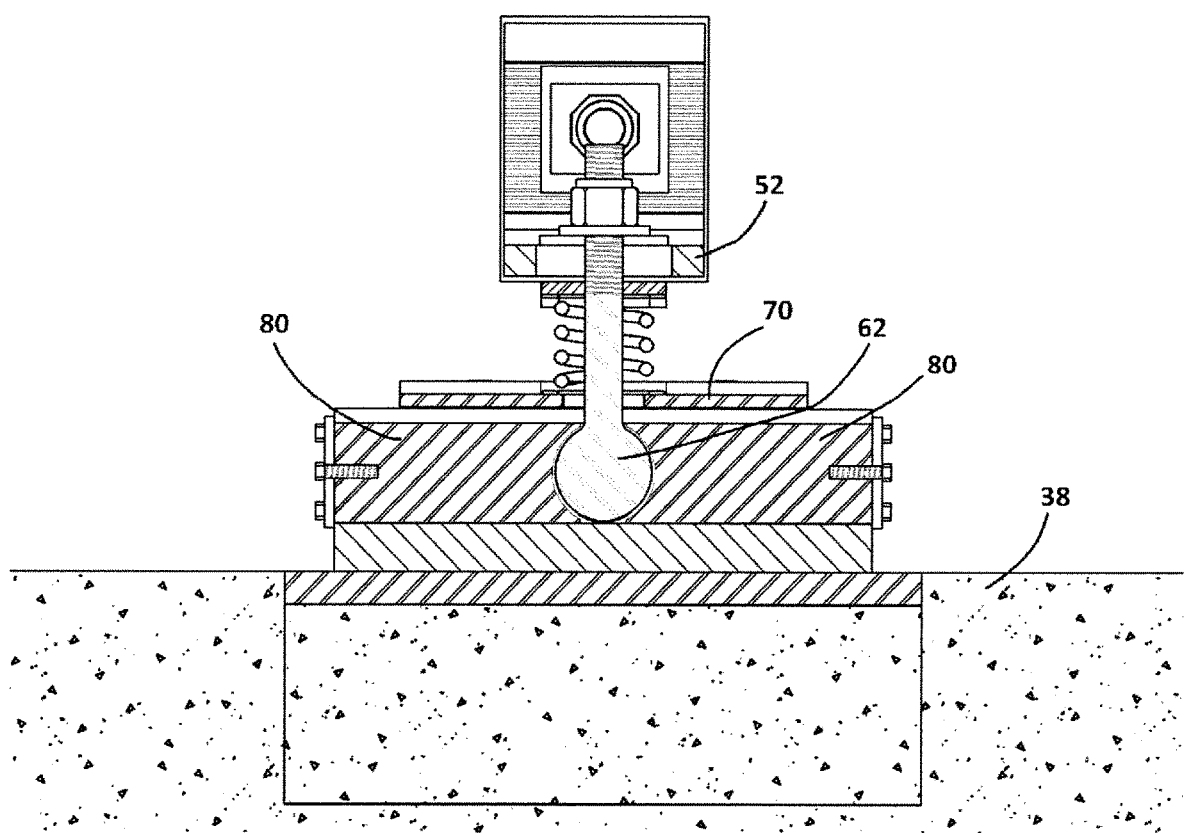
FIG. 5b is a longitudinal vertical sectional view of the preferred embodiment.

The preferred embodiment of the curtain wall panel mount system 33 according to the invention is shown in FIGS. 3, 4 and 5. A slab-mounting structure mounted on the slab of one of the floors of a multi-story building comprises a channel beam 34 that is rigidly attached to an embedded steel plate, angle, channel or other embedded steel anchor. In the illustrated embodiment it is attached to a bent plate slab corner 36 along the edge of the slab 38. The channel beam 34 preferably comprises an inwardly extending securement flange 40 through which the channel beam 34 is secured to the corner 36, such as by bolts 42. The channel beam 34 also includes a shoulder 44 defining a frusto-cylindrical channel 46 along the outer edge of the channel beam 34. The frusto-cylindrical channel 46 opens upwardly through a throat portion 48 of the shoulder 44 with the truncation of the channel representing the portion from which the throat is defined. The channel is therefore substantially cylindrical.

A panel-securing structure comprises an angle 52. The curtain wall panel 50 is secured to the angle 52 such as by means of bolt 54. An aperture in the angle 52 for receiving the bolt 54 may be oversized so as to accommodate limited movement of the wall panel 50 under seismic stress.

An inwardly directed leg 56 of the angle 52 extends to overlie shoulder 44 of the channel beam 34. A space 58 is provided between leg 56 and the top of the shoulder 44. Apart from extending leg 56 so as to overlie the shoulder 44, leg 56 is also made of sufficient length to provide a space 53 between the inner surface 51 of the wall panel 50 and the outer surface 39 of the corner 36.

The connection between the wall panel 50 and the building structure is by means of a ball stud 60. The ball stud 60 comprises a spherical ball 62 that is sized to sit snugly within cylindrical channel 46 while allowing swiveling of the ball 62 within the channel 46. An elongated stem 64 extends upward from the ball 62 and through the throat 48 of the shoulder. Stem 64 is secured to leg 56 of the angle 52 that is attached to the wall panel 50.

Preferably, the ball 62 is lined with a lubricant material, for example Teflon 61, to facilitate its swiveling within the channel 46.

A compressible resilient member, preferably but not necessarily a coil spring 72, is mounted about the stem 64 between the cover 70 (or the throat 48 if there is no cover) and a bracing sleeve 74 that depends from the angle 52.

Plugs 80 are seated in channel 46 to space the ball stud 60 from the end of the channel 46 and to close the channel. Plugs 80 preferably include compressible resilient members, for example coil springs (not shown) that abut the ball 62.

Figure 6:
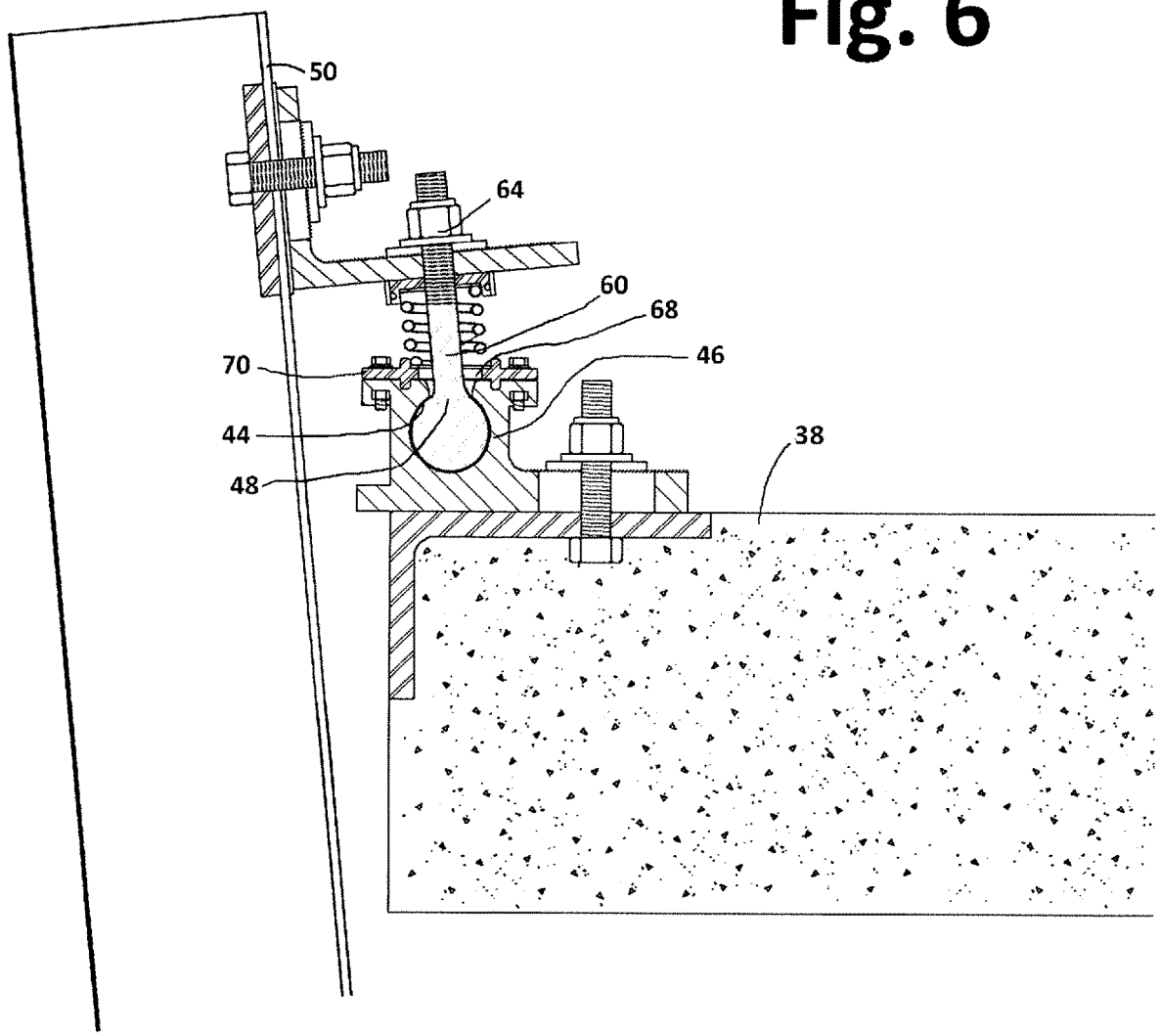
FIG. 6 is a side section view of the preferred embodiment under the influence of a seismic displacement in a first direction.
Figure 7:
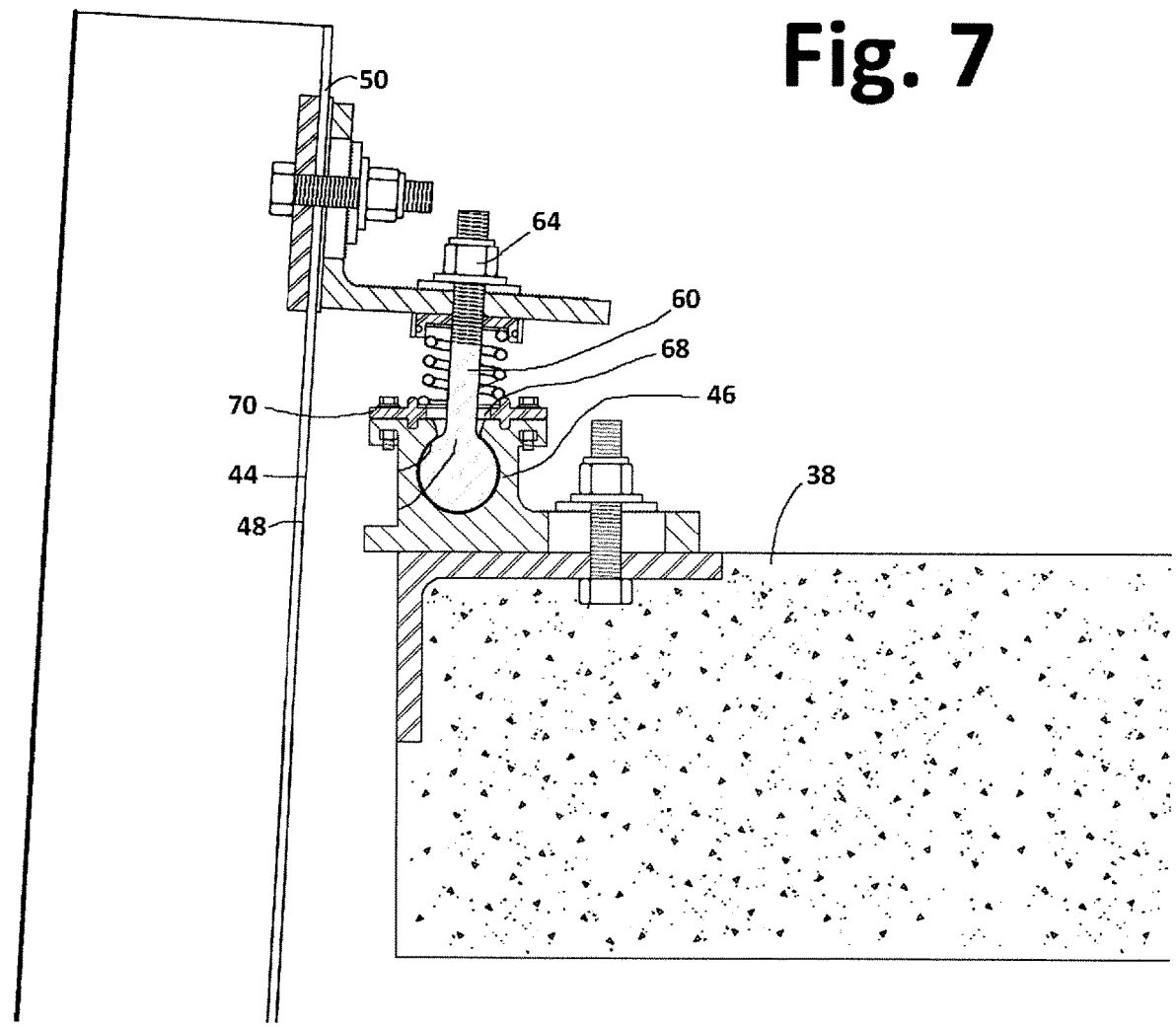
FIG. 7 is a side section view of the preferred embodiment under the influence of a seismic displacement in a second direction.

FIGS. 6 and 7 show the invention under the influence of seismic displacement. The ball stud 60 accommodates the displacement by swiveling within the channel 46 so as to angle the stem 64 of the stud to follow the change in orientation of the curtain wall panel 50. The movement of the stem in relation to the shoulder 44 of the channel beam 34 is accommodated by the throat 48 of the shoulder 44 being somewhat wider than the diameter of the stem 64.

In order to minimize the degradation of the throat 48 by contact with the stem 64, there is provided a cover 70 that straddles the shoulder 44 and that includes an opening 68 that limits the displacement of the stem 64 against the throat 48.

Figure 8:
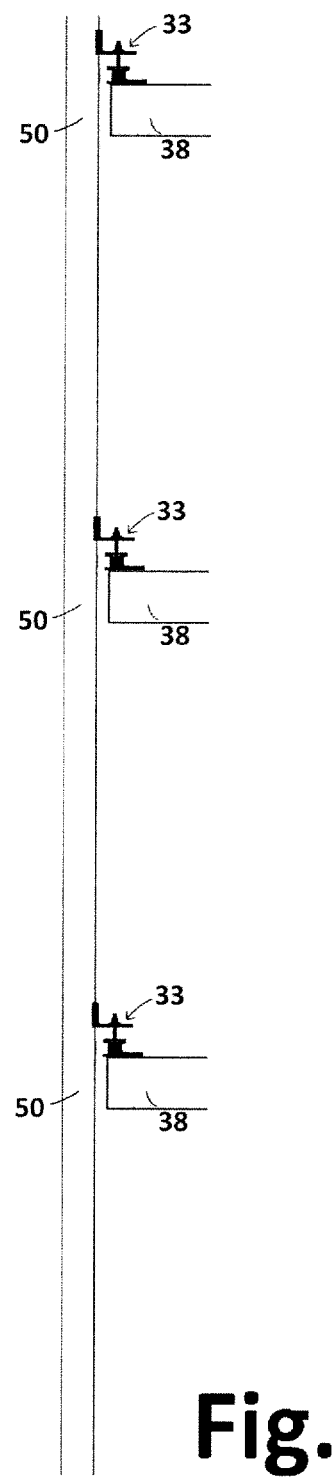
FIG. 8 is a side elevation of a multi-story curtain wall with the mount system of the invention, without seismic stress.
Figure 9:
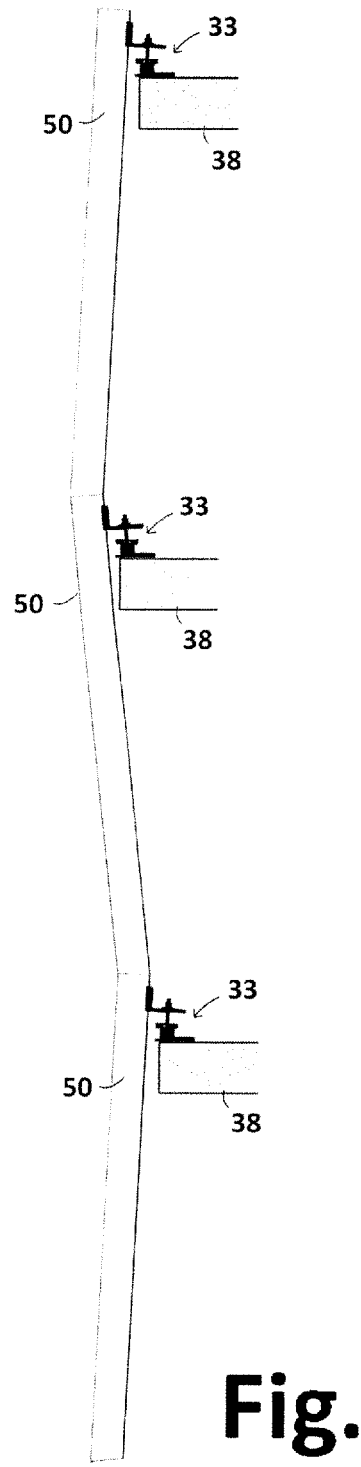
FIG. 9 is a side elevation of a multi-story curtain wall with the mount system of the invention, while undergoing seismic stress.

FIGS. 6 and 7 show the overall effect on a curtain wall of seismic displacement using the mount system 33 according to the invention. FIG. 8 shows the curtain wall without any seismic stress, with the successive adjacent panels 50 in mutual alignment within a vertical plane. FIG. 9 shows the wall under seismic stress wherein the individual wall panels 50 are permitted for the mounting system 33 of the invention to displace at mutual angles that are different from those of adjacent wall panels thereby minimizing the stresses between adjacent wall panels.

Referring to FIG. 3, as the wall panel 50 is secured to the mount system 33 at a position that is above the slab 38 in the preferred embodiment, that part 86 of the panel 50 that is adjacent to the edge of the slab may need to approach the slab and encroach into space 84 between the slab 38 and the panel 50. Thus the length of leg 56 is chosen to provide a sufficient unstressed spacing 84 to accommodate the anticipated displacement of the wall panel during a seismic event.

It is contemplated that the means of receiving the swiveling ball 62 and stud 64 according to the invention may comprise a form of slab-mounting structure other than an elongated beam comprising a channel. For example, a channel may be provided in a shorter segment that is not properly considered to comprise a "beam". Any slab-mounting structure that can accommodate a channel is within the broader scope of the invention.

While an elongated channel is contemplated in the preferred embodiment, a frusto-spherical socket (the truncation of the sphere representing the portion that the anchor stem extends from) may be used to receive the swivelable ball 62. A plurality of such sockets may be disposed along one or more slab-mounting structures along the edge of the slab. However it is contemplated that one advantage of using a channel having some length is to more easily accommodate seismic displacement along the lengthwise direction. Accordingly, the inventor prefers an embodiment wherein the slab-mounting structure defines a channel rather than a discrete socket.

Figure 10:
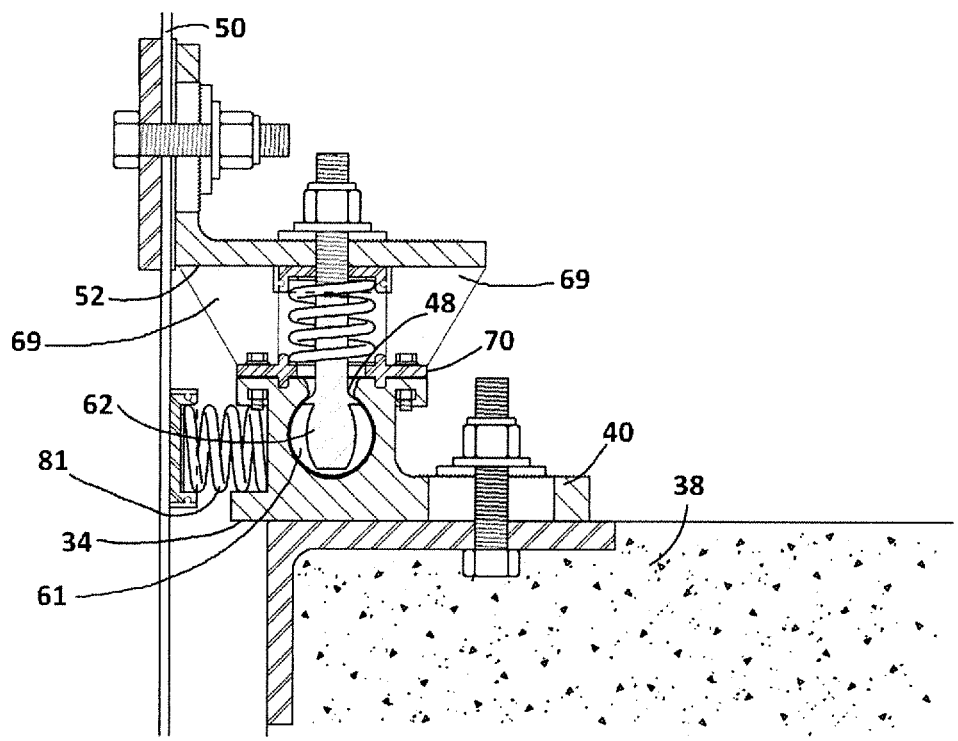
FIG. 10 is a view corresponding to FIG. 5a, but for an alternative embodiment using a horizontal spring and a rubber cushion.
Figure 11:
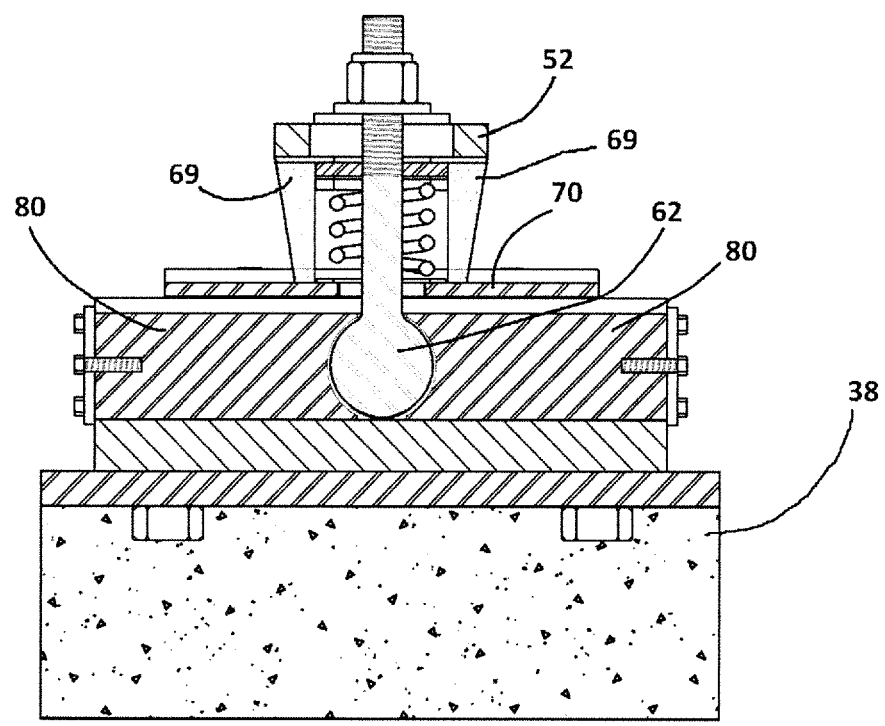
FIG. 11 is a longitudinal vertical sectional view of the alternative embodiment shown in FIG. 10.
Figure 12:
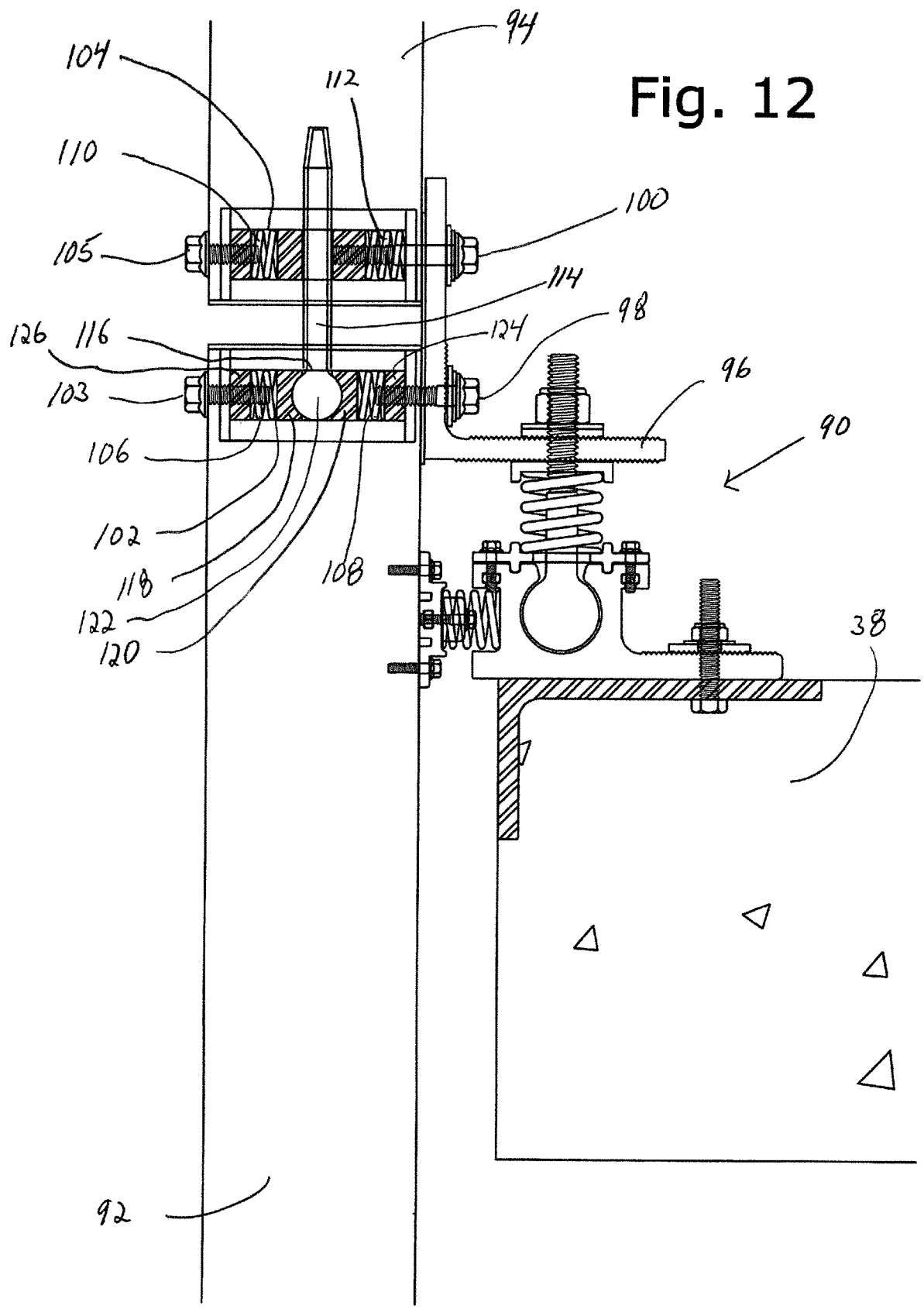
FIG. 12 is a side sectional view of a second alternative embodiment of a seismic anchoring system.

In an alternative embodiment shown in FIGS. 10 and 11, a rubber bearing pad 69 may be interposed between the cover 70 and the angle 52. Pad 69 is provided with a central bore to accommodate the stem 64 and the spring 72. A horizontal coil spring 81 may also be mounted between the wall panel 50 and the beam 34 to minimize the potential for impact of the wall panel 50 to the building structure or the beam 34.

A second alternative embodiment is illustrated in FIGS. 12-15. A ball anchor system 90 of the type described in relation to the embodiment of FIG. 10 is provided between the slab 38 and a first wall panel 92. In addition, a second adjacent panel 94 is secured to the same angle 96 that is used to secure the panel 92. Bolts 98, 100 that are used to attach to the respective panels 92, 94 extend into respective channels 102, 104 that are provided in the body of panels 92, 94. Preferably, the channels 102, 104 are each bracketed in the respective panels by outboard bolts 103, 105.

Each channel is provided with resilient members 106, 108, 110, 112 which may be, for example, springs or rubber plugs. As illustrated, pairs of resilient members (106, 108 for channel 102, and 110, 112 for channel 104) may be used to resiliently resist displacement of a ball and stem anchor 114 in either direction along the channels 102, 104.

Figure 13:
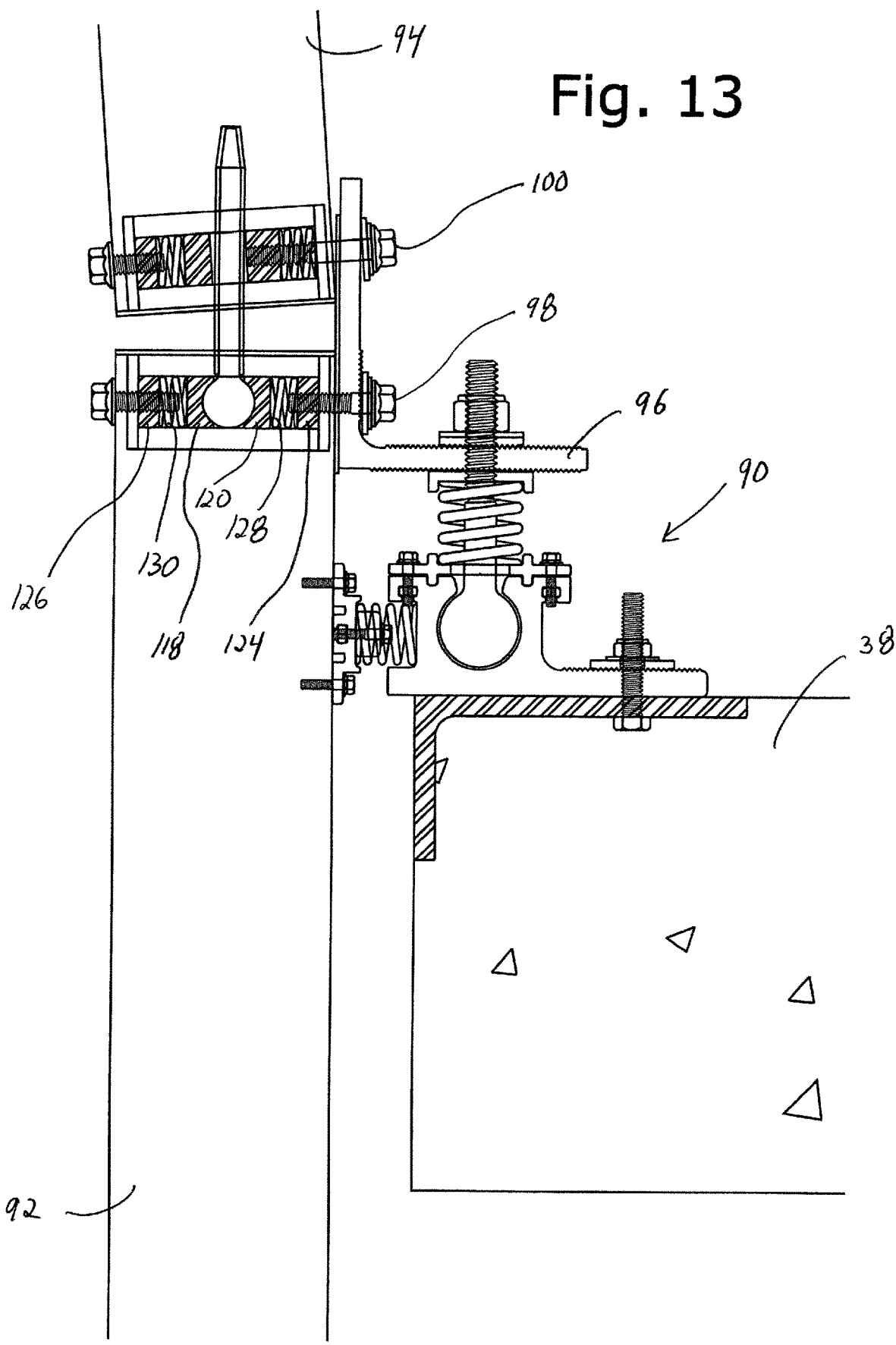
FIG. 13 is a side sectional view of the second alternative embodiment wherein a top panel is being deflected outward.

The stem of the anchor 114 extends from panel 92 to panel 94, past a neck 116 in channel 102 of panel 92 and through the central portion of channel 104 of the top panel 94. Plugs 118, 120 are fitted around the ball 122 of the anchor in channel 102. The ends of the bolts 98, 103 are secured in respective plugs 124, 126 within channel 102. Referring to FIG. 13 for clarity of the labelling, a spring 128 is provided between plugs 120 and 124. A spring 130 is provided between the plugs 118, 126. A similar arrangement is provided in channel 104.

Figure 14:
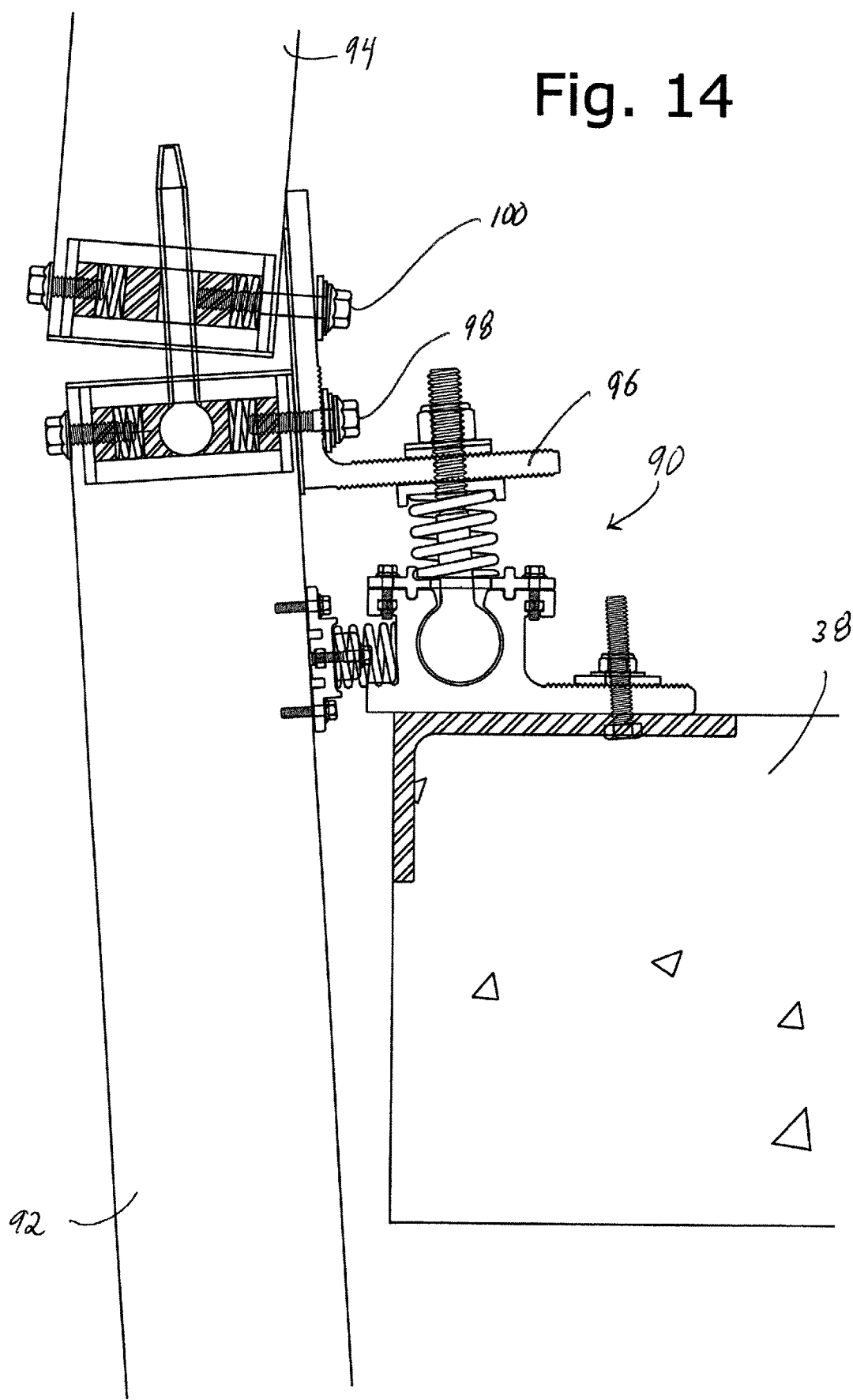
FIG. 14 is a side sectional view of the second alternative embodiment wherein a top and a bottom panels are being deflected inward; and, FIG. 15 is side sectional view of the second alternative embodiment wherein a bottom panel is being deflected outward.
Figure 15:
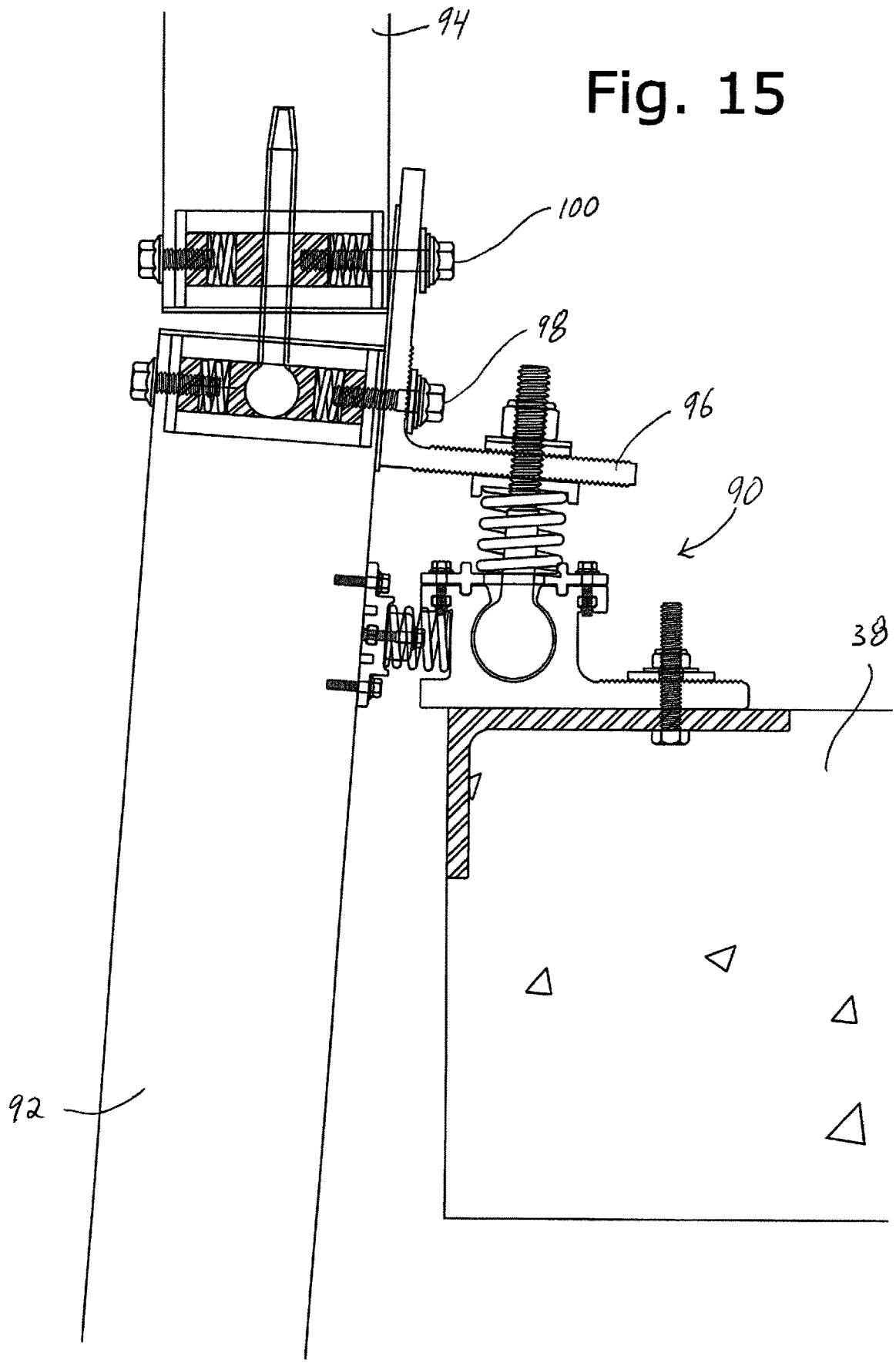

When the structure is under seismic stress, as illustrated in FIG. 14, the connections between the panels 92, 94 and the angle 96 is a pivotable one achieved by compression of the springs 128, 130 in channel 102 and corresponding springs in channel 104.

When combined with the resilient anchor system 90 between the slab 38 and the panels 92, 94, the second alternative embodiment provides a significant amount of resiliency and opportunity to allow the panels to pivot in relation to one another, in relation to the angle to which they are secured and in relation to the slab of the building.

It will be appreciated that the second alternative embodiment illustrated in FIGS. 12-15 for vertically adjacent panels may equally be provided for laterally adjacent panels.

Figure 16:
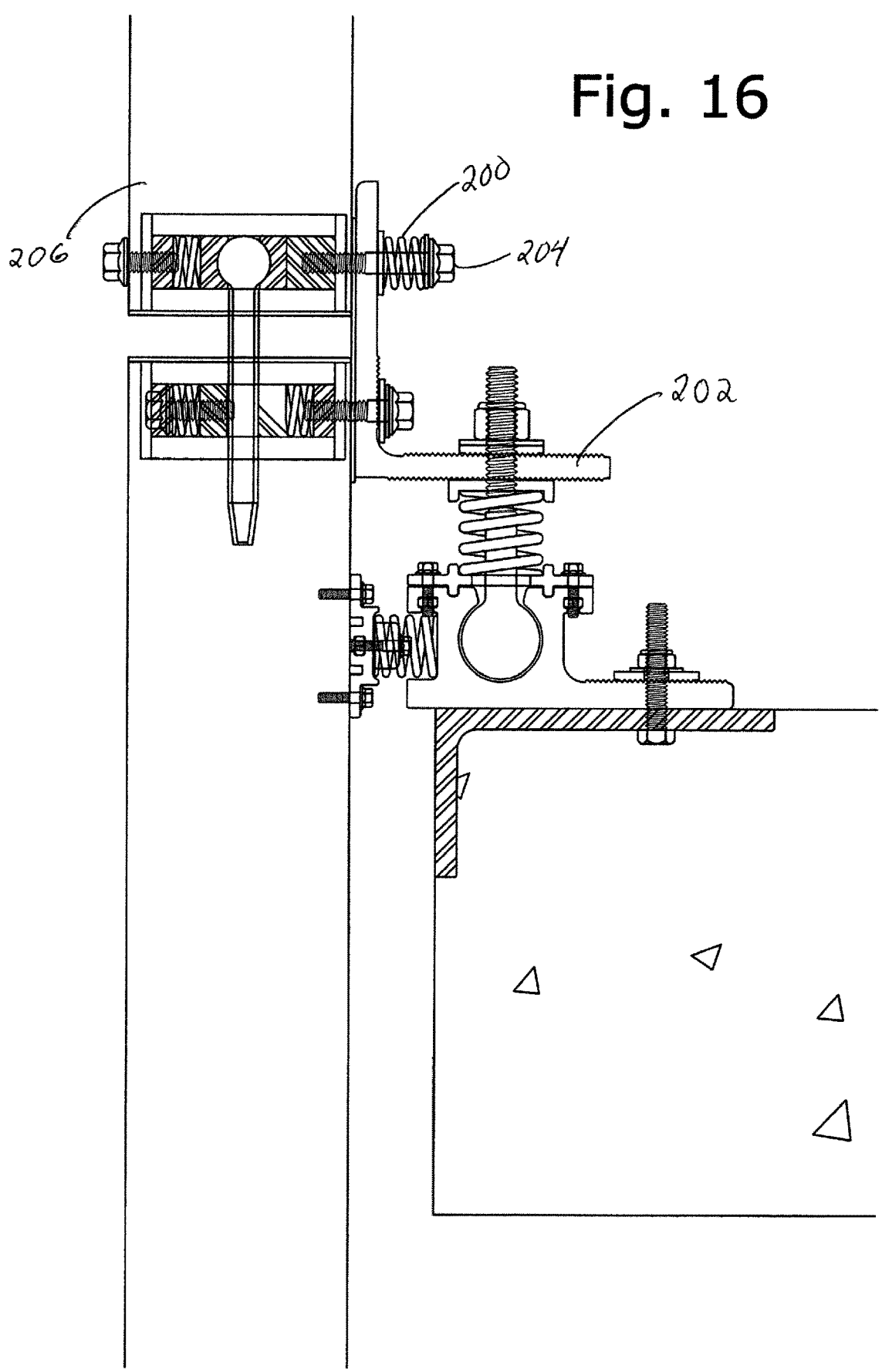
FIG. 16 is a side sectional view of the second alternative embodiment wherein the top panel is connected to angle with a spring.

FIG. 16 illustrates the use of a spring 200 between the angle 202 and the bolt 204 that secures panel 206.

Figure 17:
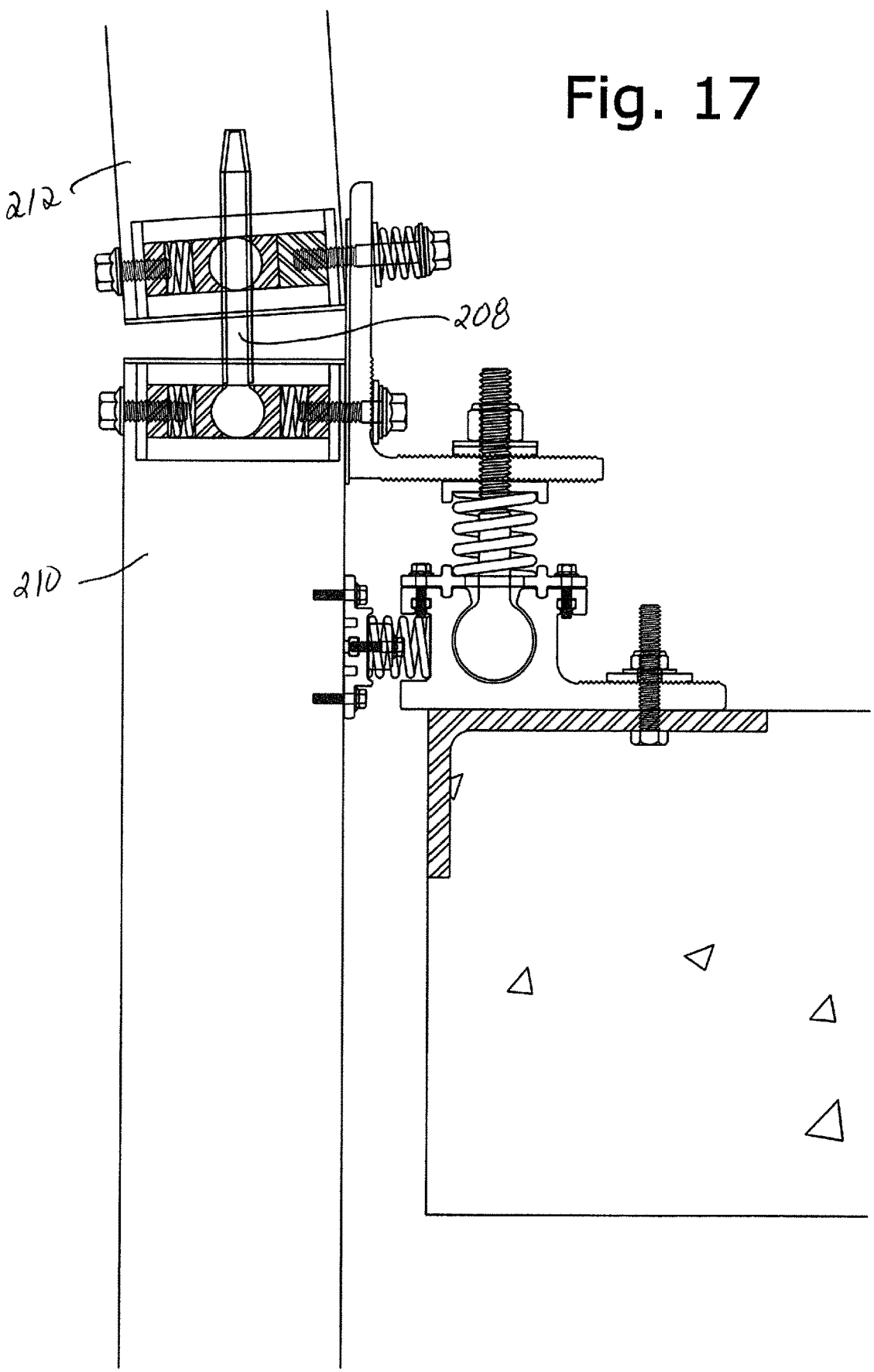
FIG. 17 is a side sectional view of the second alternative embodiment wherein the pin is orientated upward.

FIG. 17 shows an embodiment wherein pin 208 is pointed upward between the two adjacent panels 210, 212.

Figure 18:
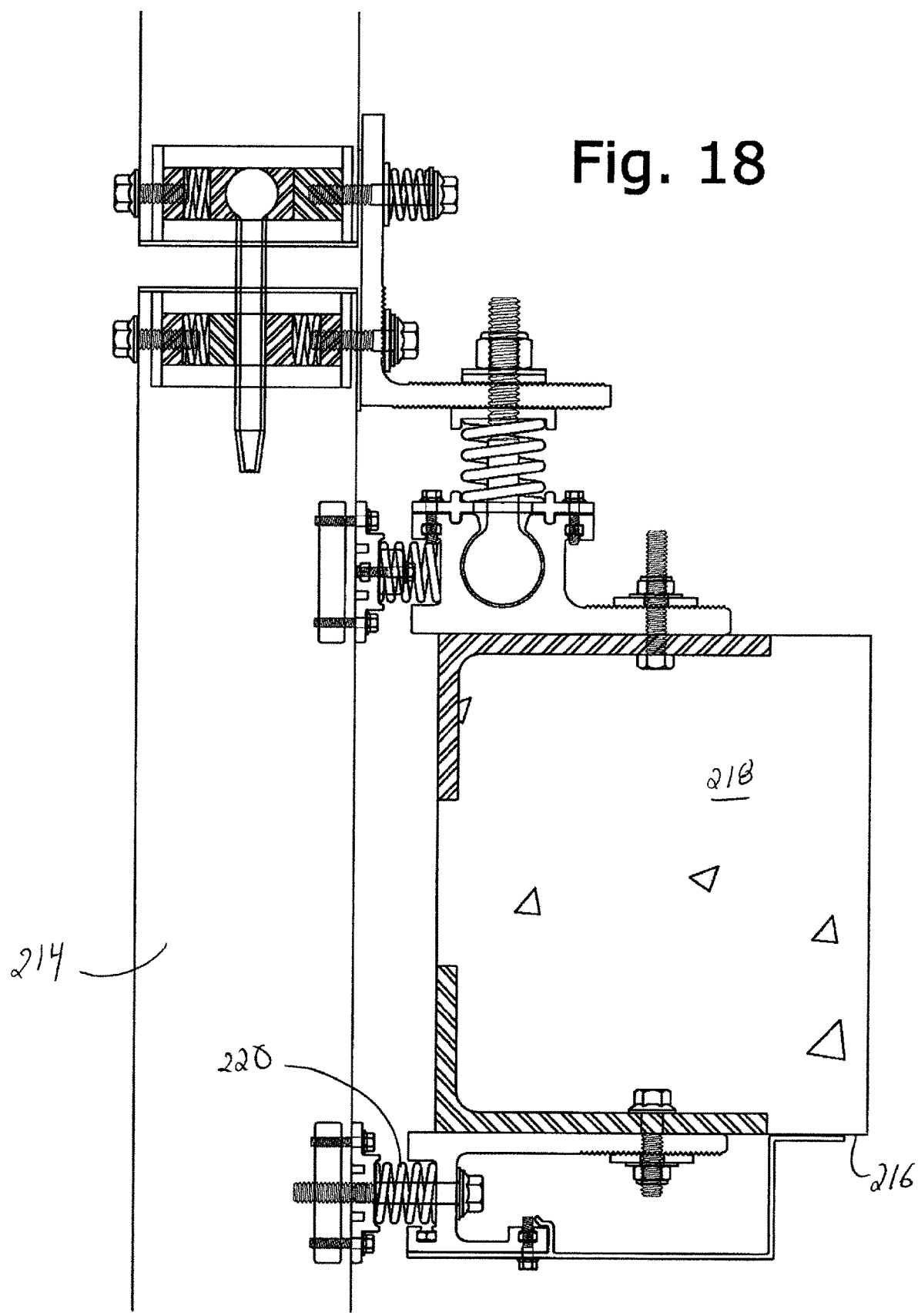
FIG. 18 is illustrating an additional connection of the panel to the underside of the slab.

FIG. 18 shows an embodiment wherein panel 214 is also attached to the bottom 216 of the slab 218 by a connection involving a spring 220.

The preferred and alternative embodiments of the invention have been described in the context of buildings having concrete slab floors. However the invention may be applied to floors made of materials other than concrete. In each case, the mount system of the invention is located on the edge of the floor.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

What is claimed is:

1. A curtain wall panel mounting system to accommodate seismic stresses, comprising:
 a slab-mounting structure mounted on an outer edge of a floor of a multi-story building slab;
 a panel-securing structure for securing a wall panel to said panel-securing structure; and,
 an anchor comprising a stem secured to said panel-securing structure;
 wherein said anchor comprises an end depending from said stem, wherein said end is spherical and is received in a cavity in said slab-mounting structure, wherein said cavity comprises a frusto-circular cross-section such that said end swivels within said cavity to pivot said anchor and said wall panel; wherein said wall panel is secured to said panel-securing structure by an elongated member extending from said panel-securing structure to inside a channel within said wall panel, and wherein an end of said elongated member is disposed within said channel and is slidable against a resilient member in said channel.

2. The curtain wall panel mounting system as in claim 1, wherein said cavity comprises a frusto-cylindrical shape.

3. The curtain wall panel mounting system as in claim 1, wherein said cavity comprises a frusto-spherical shape.

4. The curtain wall panel mounting system as in claim 1, further comprising a spring interposed between said slab-mounting structure and said panel-securing structure.

5. The curtain wall panel mounting system as in claim 1, wherein said slab-mounting structure comprises an angle attached to said multi-story building slab and a channel beam secured to said angle.

6. The curtain wall panel mounting system as in claim 1, wherein said panel-securing structure comprises an angle secured to said wall panel.

7. The curtain wall panel mounting system according to claim 1, further comprising a second wall panel secured to said panel-securing structure by a second elongated member extending from said panel-securing structure to inside a second channel within said second wall panel, wherein an end of said second elongated member is disposed within said second channel of said second wall panel and is slidable against a second resilient member in said second channel of said second wall panel.

8. A ball anchor mount system for panels of a curtain wall in a multi-story building, comprising:
- a frusto-cylindrical channel located along an edge of a floor of said multi-story building;
- a ball anchor received in said frusto-cylindrical channel, wherein a ball portion of said ball anchor is sized to fit snugly within said frusto-cylindrical channel and to be swivelable within said frusto-cylindrical channel;
- wherein said ball anchor comprises a stem extending from said ball anchor;
- an aperture in said frusto-cylindrical channel, wherein said stem extends through said aperture, and wherein said aperture accommodates some lateral displacement of said stem as said ball portion swivels within said frusto-cylindrical channel;
- wherein said stem is secured to a curtain wall panel, by a panel-securing structure, wherein said curtain wall panel is secured to said panel-securing structure by an elongated member extending from said panel-securing structure to inside a channel within said curtain wall panel, wherein an end of said elongated member is disposed within said channel and is slidable against a resilient member in said channel; and
- wherein said ball anchor swivels within said frusto-cylindrical channel to accommodate a re-orientation of said curtain wall panel under an effect of a seismic event.

9. A curtain wall panel mounting system to accommodate seismic stresses, comprising:
- a slab-mounting structure mounted on an outer edge of a floor of a multi-story building slab;
- a panel-securing structure for securing a wall panel to said panel-securing structure; and,
- an anchor comprising a stem secured to said panel-securing structure;
- wherein said anchor comprises an end depending from said stem, wherein said end comprises a substantially circular vertical cross-section and is received in a cavity in said slab-mounting structure, and wherein said cavity comprises a frusto-circular cross-section such that said end swivels within said cavity to pivot said anchor and said wall panel; and,
- wherein said wall panel is secured to said panel-securing structure by an elongated member extending from said panel-securing structure to inside a channel within said wall panel, and wherein an end of said elongated member is disposed within said channel and is slidable against a resilient member in said channel.

10. The curtain wall panel mounting system according to claim 9, further comprising a second wall panel secured to said panel-securing structure by a second elongated member extending from said panel-securing structure to inside a second channel within said second wall panel, wherein an end of said second elongated member is disposed within said second channel of said second wall panel and is slidable against a second resilient member in said second channel of said second wall panel.

* * * * *